July 22, 1941.  E. A. DERUNGS  2,250,221
ELECTRICAL CONTROL DEVICE FOR CLUTCH AND GEAR MECHANISMS
Filed May 6, 1939  3 Sheets-Sheet 1
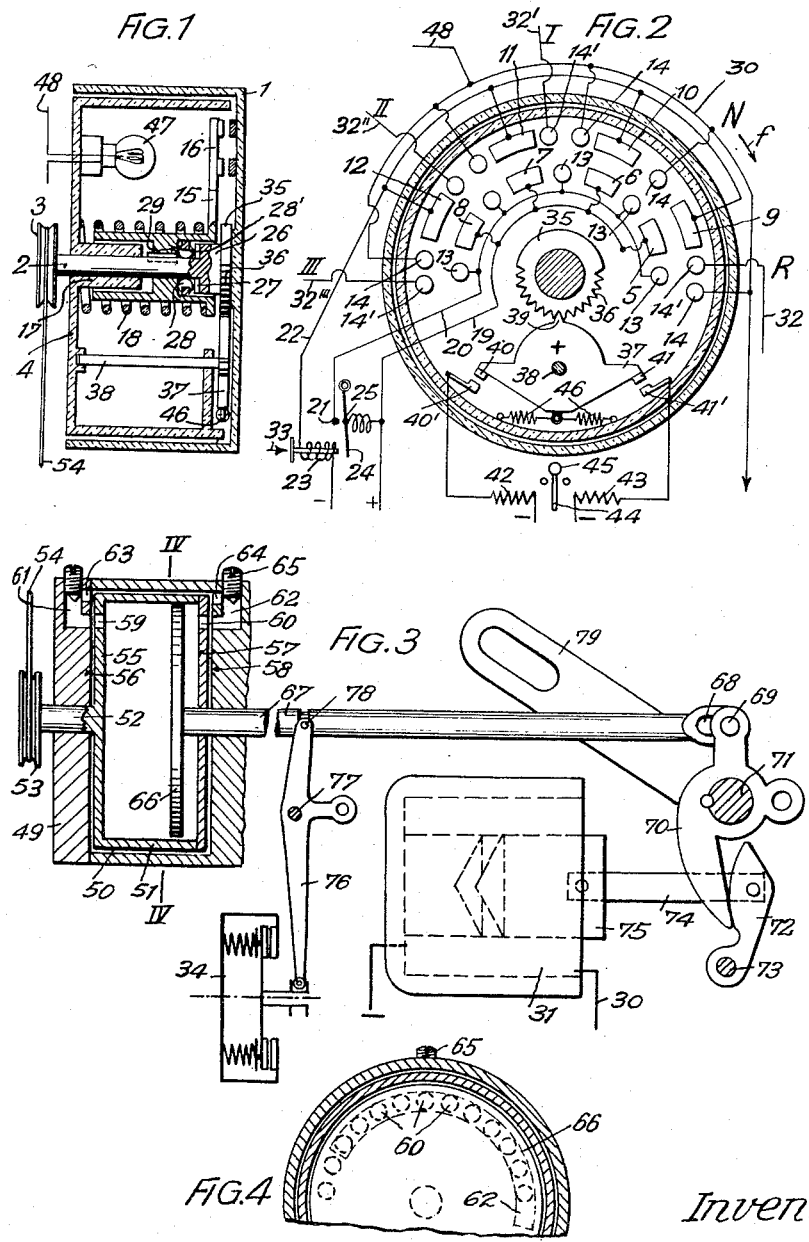
Inventor:
Ernest A. Derungs
By Sommers & Young
Attys

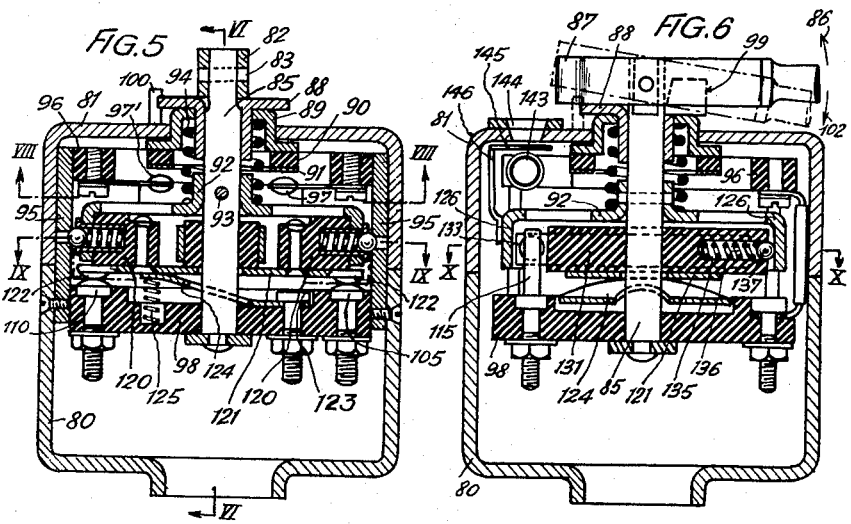

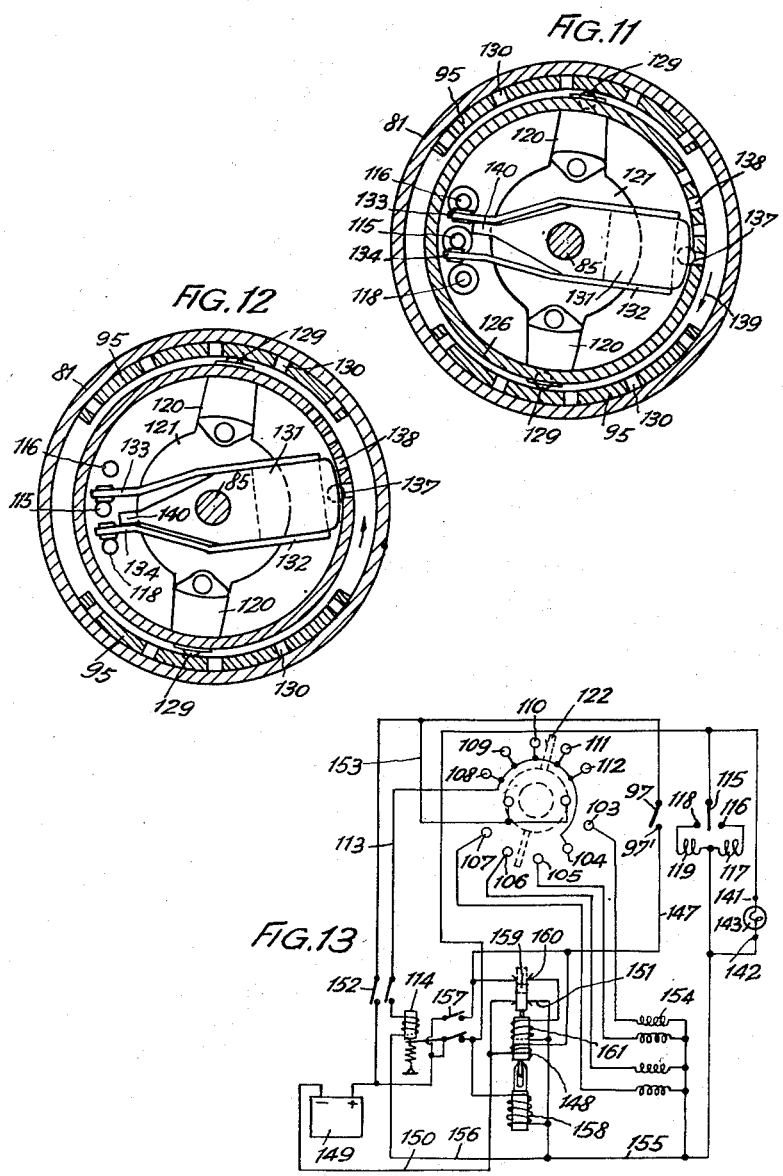

Patented July 22, 1941

2,250,221

UNITED STATES PATENT OFFICE 2,250,221

ELECTRICAL CONTROL DEVICE FOR CLUTCH AND GEAR MECHANISMS

Ernest Alphonse Derungs, Neuilly-sur-Seine, France

Application May 6, 1939, Serial No. 272,242
In France May 7, 1938

2 Claims. (Cl. 192—3.5)

This invention relates to electrical control devices and more particularly to a control device including a commutator adapted to control the exciting circuits of an electro-magnetic system which is used for the operation of a motor vehicle.

It is an object of the invention to provide a manually operated electrical control device adapted to control electromagnetic apparatus operating the clutch of a motor vehicle, the change speed gear of the vehicle, and other auxiliary devices used in operating the vehicle. A further object of the invention is the provision of a dash-pot which controls the operation of the electro-magnetically actuated apparatus and which is connected to the commutator whereby the influence of the dash-pot on the operation of said apparatus is varied according to the position of the commutator. A still further object is provision of means for automatically controlling the fuel supply of the motor according to the requirements corresponding to the effected change of speed, this control of fuel supply being strictly limited to the period between the release of the clutch and the introduction of a new speed in the change speed gear.

Other objects and advantages of the invention will more fully appear from the following description when taken in connection with the accompanying drawings.

In the drawings,

Figs. 1 and 2 are diagrammatic showings of a vertical and a horizontal section through a commutator according to the present invention.

Fig. 3 is an axial section through a dash-pot the action of which is controlled by the commutator.

Fig. 4 is a section along the line IV—IV of Fig. 3.

Fig. 5 is an axial section through a modified form of a commutator according to the invention.

Fig. 6 is an axial section taken in a plane disposed at right angles to the plane of section of Fig. 5, along the section line VI—VI thereof.

Fig. 7 is a top plan view of the commutator.

Fig. 8 is a section along the line VIII—VIII of Fig. 5.

Fig. 9 is a section along the line IX—IX of Fig. 5.

Fig. 10 is a section along the line X—X of Fig. 6.

Figs. 11 and 12 are two sections corresponding to that of Fig. 10 but showing the parts in different positions of operation.

Fig. 13 is a diagram of the electrical system which is controlled by the commutator.

The commutator according to Figs. 1 and 2 is designed to control an electromagnetic operating system of a motor vehicle having a clutch and a change speed gear comprising three forward speeds, a neutral position and one reverse speed.

This commutator comprises a rotatable drum 1 of insulating material to which is secured a shaft 2 carrying a pulley 3. The shaft 2 is loosely carried by a supporting member 4, secured to any suitable part, for example to the dash-board of a motor car and in reach of the driver.

The drum 1 carries four contact pieces 5, 6, 7 and 8 disposed along a circle around the axis of the shaft 2 and four contact pieces 9, 10, 11 and 12 disposed along a circle having a greater diameter. Five contact pieces 13 are alternately disposed with the four contacts 5, 6, 7 and 8, while double contacts 14 and 14' are disposed between the outer contacts 10, 11 and 12, and outside of the contacts 9 and 12, and a simple contact 14 is disposed between the contact pieces 9 and 10.

A contact arm 15 carrying a contact piece 16 is mounted on the hub 17 of the support 4 so as to be able to axially slide but not to rotate relatively to the support. The arm 15 is constantly urged towards the face of the drum 1 by a spring 18 and the contact piece 16 is adapted to electrically connect the contacts 5, 6, 7, 8 of the inner row of contacts with the contacts 9, 10, 11 or 12 respectively of the outer row of contacts, or one of the contacts 13 with either two contacts 14 and 14' or with the single contact 14.

By rotating the drum 1 by means of the hand, it can be moved so that the contact arm 15 is brought to the positions R, N, I, II or III, relatively to the drum 1, which positions correspond to reverse speed, neutral position, first, second and third speeds, respectively, of the change speed gear.

The four contacts 5, 6, 7, 8 are connected to a common conductor 19 which is connected to the positive pole of a current supply. The contacts 13 are each connected to a common conductor 20 connected with a contact 21. The four contacts 9, 10, 11, 12 are connected to a common conductor 22 leading to a relay 23 which is also connected to the negative pole of the current supply. The armature 24 of the relay carries a contact 25 which, when the relay is excited and the armature attracted, comes in touch with the contact 21.

The shaft 2 is provided with a collar 26 the radial face of which comprises a series of teeth or dogs 27 cooperating with a series of balls 28, these balls being prevented from rotating around the shaft 2 by means of a cage 28' but being axially movable with the hub of arm 15 in which cage 28' is fixedly mounted. The balls 28 abut a face 29 of the hub of the arm 15 so that upon rotation of the drum 1 and of the shaft 2, the balls 28 alternately move over the teeth 27 so as to be pushed against the face 29 and axially move the arms 15 against the action of the spring 18 to lift the contact piece 16 off the contacts on the drum to the position shown in Fig. 1, and then the balls fall back between two adjacent teeth whereby the spring 18 moves the contact arm 15 towards the drum and applies the contact piece 16 against the two series of contacts on the drum. There are so many teeth 27, that to each position R, N, I, II and III of the commutator, as well as to each two cooperating contacts 5 and 9, 6 and 10, 7 and 11, 8 and 12 correspond a space between two teeth, so that when the drum 1 is moved to either of these positions, the contact piece 16 electrically connects the cooperating contacts of the two circularly disposed series of contacts. For instance, when the commutator arm 15 is in the position N corresponding to the neutral position of the change speed gear, the contact piece 16 connects the two contacts 13 and 14 on the position N. When it is desired to obtain first speed, the drum 1 is turned so as to bring the contact arm 15 to the position I. By rotating the drum and the shaft 2, the teeth 27 push the balls 28 and the arm 15 axially away from the drum. The contact piece 16 is lifted off from the contacts 13 and 14 and approaches the contacts 6 and 10, and owing to axial movement of the contact arm, an undesired electrical connection between adjacent contacts of the same row, as 6 and 13, or 10 and 14, is prevented. After the balls 28 have passed over one tooth 27, they fall down between successive teeth and the spring 18 presses the arm 15 against the drum 1 again, whereby the contact piece 16 is applied on the contacts 6 and 10. Further rotation similarly causes the contact piece 16 to be lifted off the contacts 6 and 10, and then to be applied on the contacts 13 and 14, 14' corresponding to position I.

The contacts 14 of the outer circular series of contacts on the drum 1 are all connected to a conductor 30 which leads to an electromagnet 31 (Fig. 3) provided to release the clutch 34 and the change speed gear as will be described hereinafter. The contacts 14' are each connected to a separate conductor 32, 32', 32'' and 32''', each of these conductors leading to a different electromagnet, not shown, each of which, upon being excited, selects the speed of a change speed gear to be thrown in; an apparatus of this type is shown in my copending U. S. application Ser. No. 131,719, which has matured into Patent No. 2,207,481 of July 9, 1940.

It is seen that when the commutator arm 15 is in the position N, the contact piece 16 connects contacts 13 and 14, but no circuit is closed, contact 13 being connected to contact 21. When moving the drum, the contact piece 16 electrically connects contacts 6 and 10, and establishes the following circuit: Positive pole of the current supply, conductor 19, contact 6, contact 10, conductor 22, relay 23, negative pole of the current supply. The relay 23 is excited and attracts the armature 24 which carries the contact 25, so that this latter abuts against contact 21. When now the drum 1 is further turned until the arm 15 arrives in the position I, the following circuits are established:

Positive pole of the current supply, contacts 25, 21, conductor 20, contact 13, contact 14, conductor 30, electro-magnet 31, negative pole of the current supply; a second circuit is established from contact 13 to contact 14' and conductor 32' which is connected to the electromagnet selecting first speed of the change speed gear. The electro-magnet 31 produces the release of the clutch and the engagement of the selected gears of the change speed gear, and when these gears have been engaged, an abutment moving with gear operating members and diagrammatically indicated by the arrow 33 (Fig. 2) produces retraction of the armature 24 and separation of the contacts 21 and 25 which thus open the electric circuit of the electromagnet 31 and of the speed selecting electromagnet. The electromagnet 31 becomes deenergized and the clutch 34 engages by the action of its springs. The motor vehicle is now running at first speed.

A disc 35 is secured to or integral with the shaft 2. A portion of the periphery of this disc is provided with teeth as shown at 36. An oscillatable contact lever 37 is mounted with its axis 38 on the support 4 and is provided with a projection 39 engaging the toothing 36. The lever 37 carries two contacts 40 and 41 which are electrically connected with the axis 38 being itself electrically connected to the positive pole of the current supply. The two contacts 40 and 41 cooperate with fixed contacts 40' and 41' which are connected to electromagnets 42 and 43, respectively. A common armature 44, disposed between the two electromagnets, operates a shaft 45 which controls the fuel supply of the motor and which, according to the direction of its rotation increases or decreases the fuel supply. When the drum 1 is rotated in the direction of the arrow f so as to pass to first, second or third speed, that is when the reduction ratio of the change speed gear decreases, the teeth 36 acting against the projection 39, produce an oscillation of the lever 37 so as to close the contacts 40, 40' which are maintained closed as long as the movement of the drum in the direction of the arrow f continues. The electromagnet 42 is energized and attracts the armature 44 which moves the shaft 45 to decrease the fuel supply independently of the action of the ordinary foot operated accelerator. When the drum 1 is rotated in opposite direction, to come back from third speed to neutral, that is when the reduction ratio of the change speed gear increases, the teeth 36 move the lever 37 so as to close the contacts 41, 41' which close the circuit of the electromagnet 43. When this latter attracts the armature 44, the shaft 45 is moved to increase the admission of the motor. Springs 46 are provided to return the lever 37 to its normal position so as to restore normal fuel supply of the motor, as soon as the movement of the drum 1 stops and a new gear of the change speed gear has been engaged.

An electric control lamp 47 is carried by the support 4 of the commutator and is connected to the conductor 30 by means of a wire 48. In this manner, each time when the circuit is closed between any of the contacts 13 and 14, the lamp 47 will light up and indicate to the driver that a new speed has passed.

Fig. 3 shows the arrangement of a dash-pot which is connected to the operating mechanism of the clutch and of the change speed gear. This dash-pot comprises a body 49 in which is formed a closed chamber 50 of circular cross section. This chamber contains a drum 51 carrying with one of its faces a shaft 52 to which is secured a pulley 53. A belt 54 runs over this pulley and over the pulley 3 of the commutator drum 1, so that movement of the drum 1 is transmitted to the drum 51.

The drum 51 is inserted into the chamber 50 with a small axial and radial play, permitting an axial movement of drum 51 so as to apply it either with its face 55 against the face 56 of the chamber 50, or with its face 57 against the face 58 of the chamber 50. The two faces of the drum 51 are provided each with a series of holes 59 and 60 which are adapted to register more or less with arcuate passages 61 and 62, respectively, provided in the body 49. These passages are in communication with holes 63 and 64, respectively, in the body 49, and screws 65 are provided to adjust the section of flow of the two passages 61 and 62.

A piston 66 is movable within the drum 51 and carried by one end of a rod 67 the other end of which is provided with a slot 68 engaging a pin 69 of a cam lever 70 keyed to a shaft 71. This cam lever 70 coacts with a second cam lever 72 rotatably mounted at 73. To this latter cam lever 72 is connected the rod 74 of the armature 75 of electromagnet 31. A clutch operating lever 76 is pivotally mounted at 77 and rotatably connected at 78 to the rod 67. An arm 79 keyed to the shaft 71 serves to actuate the above mentioned change speed operating members.

When the circuit of the electromagnet 31 is closed as above described, the armature 75 is attracted and the cam levers 72 and 70 transmit the movement of the armature with a desired transmission ratio to the rod 67 and to the arm 79. The rod 67 being pulled towards the right and produces the release of the clutch, while the arm 79 produces engagement of the desired gears in the change speed gear. When this engagement has been effected, the circuit of the electromagnet 31 is opened as above described and the clutch 34 is allowed to engage under the action of its springs.

Movement of the rod 67 in both directions is controlled by the action of the dash-pot 49, 50 and according to the position of the commutator. It will be understood, for example, that engagement of the clutch cannot be left to the action of the clutch springs alone, but must be braked so as to obtain a progressive engagement, and this engagement must be effected slower when the speed is changed from neutral to first speed, that is when starting the motor vehicle, than when changing from first to second, or from second to third speed. The desired ratio of progressive engagement is obtained by means of the described dash-pot. When for example the piston 66 moves towards the face 55 of the drum 51, the air displaced by the piston must move from one side of the piston to the other side. Owing to the pressure of air built up on the left side of the piston 66, the drum 51 is applied with its face 55 against the face 56 of the body 49, and in accordance with the angular position of the drum 51, one of the holes 59 registers more or less with the passage 61 which, by the intermediary of hole 63, the clearance between the cylindrical faces of the drum of the body 49, hole 64, passage 62 and hole 60 communicates with the space on the right hand side of the piston 66. It will be apparent that the speed with which the piston 66 is allowed to advance depends on the speed with which the air contained in the drum is allowed to be displaced from one side of the piston to the other. Preferably the holes 59 and 60 in the drum 51 will be arranged so that the braking action on the piston 66 is not the same when the piston moves in one or the other direction. This braking action will be more effective when the piston moves towards the face 55 of the drum, which movement corresponds to the engagement of the clutch, than when the piston moves towards the face 57 of the drum, which movement corresponds to release of the clutch.

When an operation of change of speed is started, the drum 51 is applied with one of its faces against one of the faces 56 or 58 of the body 49 owing to the pressure of air within the drum, as described above; this results in a braking of the movement of rotation of the drum, and as soon as an operation has been started, and before it is terminated, the driver would have to exert a particular effort on the drum 1, if he would try to move this drum. Accordingly the attention of the driver is attracted as long as an operation is not terminated and the driver would try to effect any erroneous movement of the drum 1.

Figs. 5 to 12 illustrate a modified form of commutator comprising a casing constituted by two halves 80 and 81 which may be fixed together in any suitable manner. This casing may be fixed to the steering wheel support of a motor car, so that the commutator handle 82 is in close reach of the hand of the driver. The handle is connected by means of a pin 83, passing across an elongated opening 84 of the handle, to the central shaft 85 of the commutator. When the handle is lifted and swung upwardly in the direction of the arrow 86, the end 87 of the handle abuts against a sleeve 88 and urges this sleeve downwardly into the interior of the commutator. A second sleeve 89 is adapted to move with the sleeve 88 and carries an insulating ring 90 the lower face of which is formed by a conducting washer 91. A disc 92 is rigid with the central shaft 85 by means of a pin 93. A spring 94 inserted between the disc 92 and the sleeve 89 urges the sleeves 88 and 89 upwardly and tends to return the handle 82 back to normal position, which is substantially at right angles to the central shaft, when the handle has been turned up in the direction of the arrow 86.

The lower half 80 of the commutator casing supports two brackets 95 which, at their upper end, carry a sector 96 of insulating material. This sector carries two flexible contacts 97 and 97'. When the handle 82 is swung upwardly and the sleeves 88 and 89 move axially along the central shaft towards the interior of the commutator, the ring 90 also moves downwardly and the conducting washer 91 electrically connects the two contacts 97 and 97', as long as the handle 82 is maintained in its inclined position.

The lower end of the central shaft 85 is secured to an insulating disc 98 which itself is fixed to the brackets 95. This shaft is thus guided in the disc 98 and in the sleeve 88 and can be rotated by turning the handle 82. The sleeve 88 is provided with two turned up lugs 99 between which the handle 82 is engaged, so that a movement of rotation of the handle is communicated to the sleeves 88 and 89, which thus turn together with the shaft. As appears from Fig. 7, the rotation of the handle 82, when this latter is in its normal position is limited by stops 100 and 101 to an angle which is comprised between the positions N and III corresponding to the neutral position and third speed position of the change speed gear. In order to be able to turn the handle 82 to the position R corresponding to reverse speed, the handle must be inclined in the direction of the arrow 102 in Fig. 6. The rear end 87 of the handle is then lifted and can pass above the stop 100.

The insulating disc 98 carries five contact buttons 103, 104, 105, 106 and 107. The contacts 103, 105, 106 and 107 are each connected to a speed selecting electro-magnet as will be described hereinafter with respect to Fig. 13. Contact 103 is connected to the electromagnet selecting reverse speed, contact 105 to that selecting first speed, contacts 106 and 107 to those selecting second and third speed, relatively, and contact 104 corresponds to neutral position and accordingly is not connected to any speed selecting electromagnet.

When the handle 82 is lifted in the direction of the arrow 86, its rear end 87 produces the lowering of the sleeves 88 and 89 to electrically connect the contacts 97 and 97', but when the handle 82 is inclined in the direction of the arrow 102, it can pass freely through the open space provided between the two lugs 99 so that the sleeves are not lowered and the contacts 97 and 97' not connected.

Diametrically opposite the five contact buttons 103 to 107, the insulating disc 98 carries five other contact buttons 108, 109, 110, 111 and 112. These contact buttons, and the contact 104 are all connected to a common conductor 113 (Fig. 13) leading to a relay 114. The insulating disc 98 further carries a contact plug 115 connected to the positive pole of the current supply, a contact plug 116 connected to a relay 117, and a contact plug 118 connected to a relay 119. These two relays control the decrease of the fuel supply of the motor and the increase, respectively, in like manner as had been described relative to relays 42 and 43 in Fig. 2.

The disc 92 which is rigid with the central shaft 85 carries two insulating blocks 120 to the lower face of which is riveted a conducting washer 121 which carries two diametrically opposed contacts 122, one of them coacting with the five contact buttons 103 to 107 and the other with the five oppositely disposed contact buttons 109 to 112. The insulating disc 98 carries two further contact plugs 123 which are connected to the positive pole of the current supply and which serve to fix a conducting blade spring 124 to the disc 98. This spring blade is bent up so as to make contact with the insulating washer 121. A coiled spring 125 supplies contact pressure between the blade 124 and the washer 121.

The cylindrical rim portion 126 of the disc 92 carries two tubes 127 extending into the insulating blocks 120 and containing each a coiled spring 128 which urges a ball 129 towards the brackets 95. Each of the brackets is provided with five holes 130. A hole 130 is provided exactly opposite each of the ten contact buttons 103 to 112. It results from this disposition, that when the handle 82 is turned and produces the rotation of the disc 92, this disc and the handle are yieldingly maintained in each one of the five positions corresponding to reverse speed, neutral position, first, second and third speed of the change speed gear, in which the two contacts 122 connect two of the diametrically opposed contacts 103 to 112 to the positive pole of the current supply.

An insulating member 131 can loosely turn on the central shaft 85. This member is carried by a conducting spring member 132, one end of which forms two spring blades 133 and 134, while the other end is U-shaped in cross section so as to form a kind of a cradle supporting the insulating member 131 and electrically connecting the two blades 133 and 134. The end 140 of the insulating member 131 disposed between the two blades 133 and 134 is made thinner so as to allow a certain play of the member 131 within the two blades, this play being substantially equal to that existing between the blades 133 and 134 and the adjacent contact plugs 115, 116 and 118. The other end of the insulating member 131 is provided with a hole 135 containing a coiled spring 136 which urges a ball 137 outwardly against the cylindrical rim portion 126 of the disc 92.

The rim 126 is provided with a number of holes 138 coacting with the ball 137. When the handle 82 is turned, producing a corresponding rotation of the rim 126, and when the ball 137 rolls along a smooth portion of the rim, the insulating member 131 will not be moved. But when the ball 137 enters a hole 138 and the rim continues to turn, the ball yieldingly couples the member 131 with the rim, and this member starts to turn with the rim. When the rim 126 turns in the direction of the arrow 139 in Fig. 11, the blade 133 abuts against the contact plug 116 and the blade 134 abuts against the plug 115 and the member 131 turns until its end 140 abuts against the blade 133. In this position the two blades connect the contact plug 115 to the plug 116 and the relay 117 is excited which produces a decrease in the fuel supply of the motor. When rotation of the rim 126 continues in the direction of arrow 139 (Fig. 11), the ball 137, since the member 131 cannot move any further, will be pushed inwardly by the edge of the hole 138 and arrive on a smooth rim portion between adjacent holes. When the rim 126 is moved in opposite direction as shown in Fig. 12, the ball 137 falling in a hole 138, will cause a movement of the insulating member 131 in the same direction, and the contact blades 133 and 134 connect the plug 115 to the plug 118, so as to excite relay 119 which produces an increase in the fuel supply of the motor. The holes 138 are equally spaced and the angle between adjacent holes is equal to one half of the angle comprised between two successive positions of speed, and the length of the smooth rim portion between two adjacent holes corresponds to the sum of the play between, for example, the plug 116 and blade 133, and between the blade 133 and the end 140 of the member 131.

The insulating sector 96 (Fig. 8) carries at its ends two terminal sockets 141 and 142 for connecting a control lamp 143. Above this lamp is provided an opening 144 in the casing portion 81. Beneath the opening a transparent plate 145 is carried by a bracket 146 fixed to the disc 92. This plate is provided with signs to indicate through the opening 144 the position of the change speed gear. The lamp is connected to light up each time a new speed is thrown in.

The described commutator operates in the following manner: The motor vehicle is supposed to stop with its motor idling slowly and the handle 82 is in the position N, corresponding to neutral position of the change speed gear, in which the contacts 122 are on the contact buttons 104 and 109. In order to start in reverse gear, the handle 82 is inclined in the direction of the arrow 102 (Fig. 6) so as to be able to avoid the stop 100 and turn the handle 82 in counterclockwise direction in Fig. 7. The contacts 122 are then brought on the contact buttons 103 and 108 where the disc 92 is maintained owing to engagement of the balls 129 in the holes 130. By this movement of the handle 82, no electric circuit has yet been established since the ring 90 has not been lowered and the contact blades 97 and 97' have not been connected. But now the handle 82 is lifted in the direction of the arrow 86 (Fig. 6), the contacts 97 and 97' are electrically connected by the lowered washer 91 and the conductor 147 excites a winding 148 of fine wire which is connected to the negative pole of the current supply 149 by the conductor 150. The switch 151 is closed and the following circuits are now established. Positive pole of the current supply, closed main switch 152, conductor 153, contact 124, contacts 122, contact button 103, reverse speed selector coil 154, conductor 155, switch 151, conductor 150, negative pole. Simultaneously, a current flows from a contact 122 to contact button 108, conductor 113, relay 114, conductor 156, switch 151 and to the negative pole. The energized relay 114 closes the double switch 157, so that a current can flow through winding 158 of an electromagnet which releases the clutch. The armature of this electromagnet is raised whereby the contact member 159 is also raised and closes switch 160. Current can now also pass through the winding 161 of a second electromagnet producing the desired change of speed. As had been described with respect to Fig. 2, when the change of speed is effected, the relay controlled switches 157 are mechanically opened so as to cut the circuits of the windings 158 and 161. When at this moment the handle 82 is maintained in its raised position, the contacts 97 and 97' are connected and the winding 148 is maintained in energized condition which is sufficient to hold the armatures of the windings 161 and 158 in raised position, that means the clutch is maintained in released position as long as a current passes through conductor 147.

The motor is now still idling, and while the handle 82 is maintained in raised position, the motor can be accelerated to the speed necessary for starting the vehicle, and when this speed is obtained the handle will be simply dropped to its normal position, whereby the circuit of the winding 148 is cut, the armatures fall down, and the clutch is allowed to engage.

The return movement of the handle 82 to pass from reverse speed to neutral position is effected by the same operations as above described for passing from neutral to reverse speed. The handle can then be left on neutral position or brought to any forward speed position. When the desired position of the handle has been reached, the passage of the corresponding speed is obtained in exactly the same manner as above described for reverse speed.

For passing from a forward speed to another speed the handle 82 must be operated in the following manner: The handle will be brought to the desired position by a simple rotation, which does not close any circuit, because the contacts 97 and 97' having not been connected, the relay 114 is not energized. Then the handle must be lifted in the direction of the arrow 86 (Fig. 6) so that the relay 114 is energized and the various circuits are closed as above described for reverse speed. When the handle is dropped again, the clutch engages and the car runs at the new speed.

Although I have shown particular embodiments of my improved control system as applied to vehicles, it is obvious that changes in construction, form and arrangement of parts may be made without altering the fundamental principles of operation herein explained and without departing from the scope of the invention.

I claim:

1. In combination with electric control means for motor vehicles having a change speed gear and a clutch, electromagnetically operative means for disengaging the clutch and for changing the relative position of the gears, a plurality of electric circuits for controlling said electromagnetically operative means, a commutator for closing said circuits, means for automatically opening the circuits when a change of gear has been effected, and damping means responsive to the position of said commutator for damping the movements of said electromagnetically operative means and of the clutch engaging movement.

2. In combination with electric control means for motor vehicles having a change speed gear and a clutch, electromagnetically operative means for disengaging the clutch and for changing the ratio of the change speed gear, a plurality of electric circuits for controlling said electromagnetically operative means, a commutator for closing said circuits, said commutator including a rotatable operating member movable in one direction for changing from lower to higher gear and movable in the other direction for changing from higher to lower gear, means for damping the movements of said electromagnetically operative means and the clutch engaging movement, said damping means including a rotatable cylinder operatively connected to said rotatable commutator operating member, and means on said cylinder for varying the damping action in accordance with the angular position of the cylinder whereby the damping effects depends on the angular position of the commutator operating member.

ERNEST ALPHONSE DERUNGS.